United States Patent

Hille et al.

[11] Patent Number: 6,013,114
[45] Date of Patent: *Jan. 11, 2000

[54] ENVIRONMENTALLY FRIENDLY DIESEL FUEL

[75] Inventors: Martin Hille, Liederbach; Frank Weinelt, Burgkirchen; Heinz Wittkus; Werner Reimann, both of Frankfurt, all of Germany

[73] Assignee: Clariant GmbH, Frankfurt, Germany

[ * ] Notice: This patent is subject to a terminal disclaimer.

[21] Appl. No.: 09/013,755

[22] Filed: Jan. 27, 1998

[30] Foreign Application Priority Data

Jan. 28, 1997 [DE] Germany .............. 197 02 989

[51] Int. Cl.$^7$ ............................................ C10L 1/18
[52] U.S. Cl. ............................................ 44/308; 44/444
[58] Field of Search ............... 44/308, 444, 443

[56] References Cited

U.S. PATENT DOCUMENTS

| | | | |
|---|---|---|---|
| 4,397,655 | 8/1983 | Sweeney | 44/308 |
| 4,541,837 | 9/1985 | Norton et al. | 44/53 |
| 5,354,878 | 10/1994 | Connemann et al. | 554/167 |
| 5,433,756 | 7/1995 | Gonzalez | 44/340 |
| 5,830,830 | 11/1998 | Hille et al. | 507/136 |

FOREIGN PATENT DOCUMENTS

| | | |
|---|---|---|
| 3136030 A1 | 3/1983 | Germany . |
| 3233834 A1 | 3/1984 | Germany . |
| 4129911 A1 | 3/1993 | Germany . |
| 4209779 | 7/1993 | Germany . |

OTHER PUBLICATIONS

European Search Report.

*Primary Examiner*—Jacqueline V. Howard
*Assistant Examiner*—Cephia D. Toomer
*Attorney, Agent, or Firm*—Miles B. Dearth

[57] ABSTRACT

The present invention relates to environmentally friendly diesel fuel, containing natural, liquid triglycerides of natural or animal origin, such as rapeseed or soybean oil, and acetals of the formula (I) or (II)

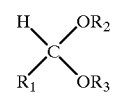

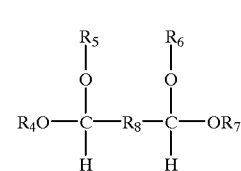

in which the substituents have the meaning defined in the description. This diesel fuel is biodegradable and free of sulfur, nitrogen and aromatics.

20 Claims, No Drawings

ENVIRONMENTALLY FRIENDLY DIESEL FUEL

BACKGROUND OF THE INVENTION

Rudolf Diesel himself used vegetable oils for operating the first diesel engines. Like many people after him, he assumed that petroleum would soon run out. The ready availability of petroleum and its fractions in the last century led, in automotive construction, to engines which are optimized with respect to the use of middle distillates of petroleum. In order to achieve a lower level of environmental pollution, considerable improvements were made both in engine technology and in the fuel composition.

Very different considerations, the reduction of the $CO_2$ emission into the atmosphere and the industrial use of renewable raw materials, once again focused attention on the use of vegetable oils. Their high viscosity makes them unsuitable for use in pure form as fuel in modern automotive diesel engines. The esters of rapeseed oil proved suitable for use in diesel engines. For this purpose, the rapeseed oil is cleaved and the resulting generally unsaturated carboxylic acids are esterified with methanol and the glycerol liberated is isolated. This chemical processing increases the cost of the rapeseed oil methyl ester as diesel fuel to a not inconsiderable extent (DE-A42 09 779, U.S. Pat. No. 5,354,878). Use in winter is limited because the setting point of these esters is between –10 and –20° C.

The use of rapeseed oil methyl esters does not result in a further accumulation of $CO_2$ in the atmosphere, because this gas was withdrawn from the atmosphere during growth. A great advantage is the biodegradability and the fact that there is virtually no sulfur content. Rapeseed oil methyl ester is therefore suitable as a fuel particularly in forestry and agriculture, in nature conservation and water catchment areas, nature reserves and lakes and rivers. Rape can be cultivated on set-aside areas, reducing the subsidies for agriculture, but the rapeseed oil methyl ester can be used economically as diesel fuel only if the State waives the imposition of a tax to a high degree or entirely. The erection of special plants for the production of rapeseed oil methyl ester will remain limited because the annual production of rape fluctuates greatly. On the one hand, these fluctuations are weather-related or a smaller or greater quantity is cultivated because other crops are preferably produced, depending on the world market price. This irregular production of the vegetable oils occurs more or less with all agriculturally produced oils. Moreover, only the excess quantities not used for food and other industrial purposes are employed for fuels.

It was therefore the object to avoid the above disadvantages of rapeseed oil methyl ester when used as a diesel fuel and to find a way of using vegetable oils in a more suitable form.

SUMMARY OF THE INVENTION

Surprisingly, it was found that the direct use of liquid vegetable or animal oils without prior esterification as diesel fuel is possible with the simultaneous use of acetals.

The invention thus relates to diesel fuels based on natural, liquid triglycerides of vegetable or animal origin and acetals.

Mixtures of acetals and rapeseed oil or other natural triglycerides of vegetable or animal origin, such as, for example, palm oil, palm kernel oil, soybean oil, peanut oil, sunflower oil, canola oil, coconut oil, tall oil or linseed oil, are used. Rapeseed oil and soybean oil are particularly suitable.

From 5 to 95% by weight of triglycerides and from 5 to 95% by weight of acetals may be used. The diesel fuel may also contain up to 75% by weight of esters, preferably rapeseed oil methyl ester, diesel oil or other organic compounds which conform to the diesel specification.

DESCRIPTION OF THE PREFERRED EMBODIMENTS

Acetals which have a flashpoint, according to the diesel specification, of more than 55° C. and advantageously a low viscosity are used. This makes it possible to establish the viscosity required for the fuel.

It is known that acetals increase the cetane number. Some mixtures of acetals and triglycerides have cetane numbers which are considerably above those currently encountered in practice, which leads to better combustion of the fuel with less emission. The acetals suitable for the invention are biodegradable, and the setting points and CFPP (cold filter plugging point) values achieved with the acetal/triglyceride mixtures are lower than those achieved with rapeseed oil methyl ester. Acetals are petrochemical products which can be produced in a large volume in existing chemical plants or chemical plants which are easily modified. Coupling the use of triglycerides as fuels with the large-scale petrochemical industry would better compensate fluctuations in the availability of, for example, rapeseed oils and other trigylcerides than special plants for the production of esters thereof, because these large plants can also be used for the production of other chemicals. These mixtures contain virtually no sulfur, nitrogen or aromatics.

The acetals of the diesel fuels according to the invention are reaction products of aldehydes or dialdehydes with alcohols and can be described by the following formulae:

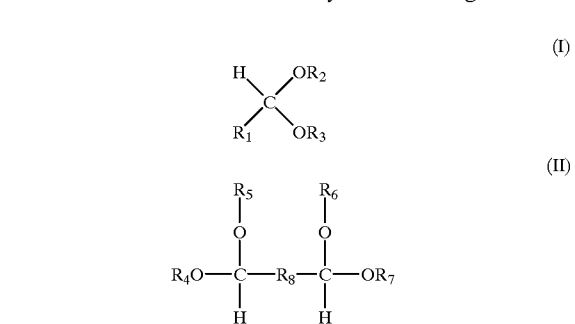

$R_1$ to $R_7$ are alkyl or alkenyl radicals of 1 to 20 carbon atoms. These radicals may be linear, branched, saturated or mono- or polyunsaturated. The sum of all carbon atoms in $R_1$ to $R_7$ may be up to 30. $R_8$ may be O or $(CH_2)_n$, where n is a number from 0 to 5.

Acetals in which $R_1$ is an alkyl radical having 1 to 6 carbon atoms, $R_2$ to $R_7$ are alkyl radicals having 1 to 12 carbon atoms and $R_8$ is an alkylene radical having 1 to 5 carbon atoms are also suitable.

Acetals in which $R_1$ is an alkyl radical having 2 to 4 carbon atoms, $R_2$ and $R_3$ are alkyl radicals having 4 to 8 carbon atoms, $R_4$ to $R_7$ are alkyl radicals having 1 to 5 carbon atoms and n is the number 0 are likewise very suitable.

For the required cetane number, these diesel fuels contain no nitrogen-containing ignition improvers which increase the emission of nitrous gases. The oxygen content may be adjusted in a wide concentration range, depending on requirements.

TABLE 1

| Sample designation Composition (in % by weight) | Setting point (at rotating thermometer) °C. DIN/ISO 3016 | Density 20° C. (Aerometer) g/cm³ DIN 51757 | Viscosity 20° C. according to Ubbelohde mPas DIN 51562 | Cetane number |
|---|---|---|---|---|
| Dibutyl formal (DBF) | −50.00 | 0.83 | 1.20 | 61.50 |
| 75% DBF 25% Rapeseed oil | −32.00 | 0.85 | 2.60 | 59.50 |
| 50% DBF 50% Rapeseed oil | −26.00 | 0.88 | 5.90 | 57.00 |
| 25% DBF 75% Rapeseed oil | −15.00 | 0.89 | 17.20 | 51.40 |
| 10% DBF 90% Rapeseed oil | −10.00 | 0.91 | 37.50 | 46.90 |
| 75% DBF 25% Soybean oil | −15.00 | 0.85 | 2.20 | 59.05 |
| 50% DBF 50% Soybean oil | −12.00 | 0.88 | 5.50 | 57.00 |
| 25% DBF 75% Soybean oil | −7.00 | 0.89 | 15.90 | 56.80 |
| 10% DBF 90% Soybean oil | −2.00 | 0.91 | 32.50 | 47.50 |
| 35% DBF 35% Rapeseed oil 30% Diesel | −23.00 | 0.85 | 4.60 | 53.80 |
| 25% DBF 25% Rapeseed oil 50% Diesel | −17.00 | 0.84 | 4.10 | 51.50 |
| 15% DBF 15% Rapeseed oil 70% Diesel | −14.00 | 0.84 | 3.60 | 49.30 |
| 17.5% DBF 52.5% Rapeseed oil 30% Diesel | −11.00 | 0.88 | 9.80 | 50.50 |
| 12.5% DBF 37.5% Rapeseed oil 50% Diesel | −15.00 | 0.86 | 7.00 | 49.40 |
| 7.5% DBF 22.5% Rapeseed oil 70% Diesel | −18.00 | 0.84 | 4.90 | 48.20 |
| Diesel | −15.00 | 0.82 | 3.30 | 45.00 |
| Soybean oil | −1.00 | 0.92 | 54.0 | <45 |
| Rapeseed oil | −15.00 | 0.92 | 70.60 | <45 |

TABLE 2

Effect of acetals on the cetane number of diesel

| Concentration of the additives (mg/kg) | No. 1 | No. 2 | No. 3 |
|---|---|---|---|
| pure diesel oil | 49.1 | 49.1 | 49.1 |
| 200 | 49.1 | 49.1 | 49.2 |
| 1000 | 49.2 | 49.3 | 49.5 |
| 20000 | 50.3 | 50.8 | 51.4 |
| 60000 | 51.0 | 52.8 | 53.5 |

No. 1: Isobutyraldehyde di-2-ethylhexyl acetal
No. 2: Butyraldehyde dibutyl acetal
No. 3: Glyoxal tetraethyl acetal

TABLE 3

Biodegradation of acetals according to OECD guidelines 301 B

| Acetal | Degradation in % after 28 days |
|---|---|
| Isobutyraldehyde 2-diethylhexyl acetal | |
| 10 mg/l | 71 |
| 20 mg/l | 63 |
| Acetaldehyde dioctyl acetal | |
| 10 mg/l | 75 |
| 20 mg/l | 66 |
| Butyraldehyde dibutyl acetal | |
| 10 mg/l | 95 | mg/l relates to the pure acetal solution.

Table 1 shows that mixtures of formaldehyde dibutyl acetal (also referred to as dibutyl formal) and rapeseed oil and soybean oil give diesel fuels which have considerably high cetane numbers in some cases. Considerable amounts of diesel oil may be added to the mixtures according to the invention. As a result, the cetane numbers required in practice are also reached. Mixtures of triglyceride and acetal in a ratio of, for example, 1:1 give the very good cetane number of 57, a setting point of less than −25° C. and viscosities of about 6 mpas. Such a winter-resistant, biodegradable diesel fuel having a high cetane number, virtually without sulfur, nitrogen and aromatics, which minimizes the emitted pollutants, would be an optimum fuel for environmentally sensitive areas, such as nature reserves, water catchment areas, forests, rivers, lakes and inner cities.

Table 2 also shows the effect of acetals as cetane number improvers in a hydrocarbon fraction suitable as diesel fuel. It is evident that cetane number improvement is proportional to the concentration of acetals of the formulae (I) and (II).

The effect is small in pure hydrocarbons, and consequently acetals have not been widely used as cetane number improvers in practice to date. There are much more effective products for this purpose, such as, for example, peroxides and nitrates, which are used in amounts of up to 500 ppm.

The optimum products based on nitrates introduce nitrogen into the diesel fuel, which increases the proportion of oxides of nitrogen in the exhaust gases (DE-A-41 29 911; U.S. Pat. No. 4,541,837; DE-A-31 36 030; U.S. Pat. No. 5,433,756; DE-A-32 33 834).

Table 3 shows the good biodegradability of acetals. It increases with decreasing molecular weight, favoring the low molecular weight acetals as preferably used for the mixtures according to the invention.

We claim:

1. A diesel fuel consisting essentially of natural triglycerides of vegetable or animal origin and an acetal.

2. The diesel fuel as claimed in claim 1, containing 5–95% by weight of said triglycerides and 5–95% by weight of said acetal.

3. The diesel fuel as claimed in claim 1, wherein the natural triglycerides are rapeseed oil, soybean oil, peanut oil, palm oil, palm kernel oil, coconut oil, tall oil, canola oil or linseed oil.

4. The diesel fuel as claimed in claim 1, wherein said natural triglycerides are rapeseed oil or soybean oil.

5. The diesel fuel as claimed in claim 1 wherein said acetal has a flashpoint of more than 55° C., and said acetal has the formula (I) or (II)

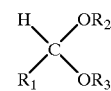
(I)

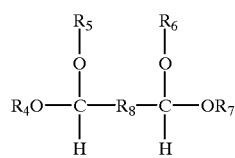
(II)

in which $R_1$ to $R_7$ are alkyl or alkenyl radicals having 1 to 20 carbons atoms, where the sum of the carbon atoms may be up to 30, and $R_8$ is O or $(CH_2)_n$, where n is a number from 0 to 5.

6. The diesel fuel as claimed in claim 5, wherein $R_1$ is an alkyl radical having 1 to 6 carbon atoms, $R_2$ to $R_7$ are alkyl radicals having 1 to 12 carbon atoms and $R_8$ is an alkylene radical having 1 to 5 carbon atoms.

7. The diesel fuel as claimed in claim 5, wherein $R_1$ is an alkyl radical having 2 to 4 carbon atoms, $R_2$ and $R_3$ are alkyl radicals having 4 to 8 carbon atoms, $R_4$ to $R_7$ are alkyl radicals having 1 to 5 carbon atoms and n is the number 0.

8. A diesel fuel comprising a natural triglyceride of vegetable or animal origin, an acetal and an ester of said triglyceride of vegetable or animal origin.

9. The diesel fuel of claim 8 wherein said acetal is:

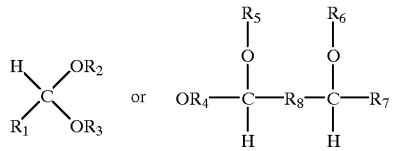

wherein $R_1$ to $R_7$ are linear or branched alkyl radicals of 1 to 20 carbon atoms or $R_1$ to $R_7$ are linear or branched mono- or polyunsaturated alkenyl radicals of 1 to 20 carbon atoms, and wherein the sum of all carbon atoms in $R_1$ to $R_7$ is 30 or less, and $R_8$ is O or $(CH_2)_n$, where n is a number from 0 to 5.

10. The diesel fuel of claim 8 wherein said triglyceride is rapeseed oil.

11. The diesel fuel of claim 9 wherein said ester is rapeseed oil methyl ester.

12. The diesel fuel of claim 8 further comprising diesel oil.

13. A diesel fuel comprising diesel oil, an acetal, and rapeseed oil.

14. The diesel fuel of claim 13 further comprising an ester of rapeseed oil.

15. The diesel fuel of claim 14, wherein said ester is a methyl ester.

16. The diesel fuel of claim 8 comprising:

5 to 95% by weight of said natural triglyceride, 5 to 95% by weight of said acetal, and an amount of said ester of up to 75% by weight.

17. The diesel fuel of claim 12 comprising:

5 to 95% by weight of said natural triglyceride, 5 to 95% by weight of said acetal, an amount of said ester of up to 75% by weight, and an amount of said diesel fuel of up to 75% by weight.

18. The diesel fuel of claim 12 wherein said acetal is:

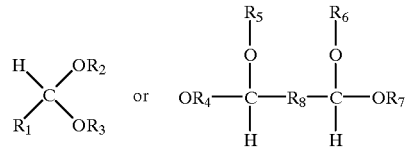

wherein $R_1$ to $R_7$ are linear or branched alkyl radicals of 1 to 20 carbon atoms, or $R_1$ to $R_7$ are linear or branched mono- or polyunsaturated alkenyl radicals of 1 to 20 carbon atoms, and wherein the sum of all carbon atoms in $R_1$ to $R_7$ is 30 or less, and $R_8$ is O or $(CH_2)_n$, where n is a number from 0 to 5.

19. A diesel fuel comprising natural triglyceride of vegetable or animal origin and an acetal having a flash point of more than 55° C. and having the formula:

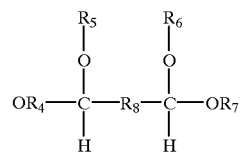

wherein $R_4$ to $R_7$ are linear or branched alkyl radicals of 1 to 20 carbon atoms, or $R_4$ to $R_7$ are linear or branched mono- or polyunsaturated alkenyl radicals of 1 to 20 carbon atoms, and wherein the sum of all carbon atoms in $R_4$ to $R_7$ is 30 or less, and $R_8$ is O or $(CH_2)_n$, where n is a number from 0 to 5.

20. A method of use of an acetal for improving the properties of natural triglyceride of vegetable or animal origin as diesel fuel, comprising incorporating into said fuel as a mixture, an acetal having the formula

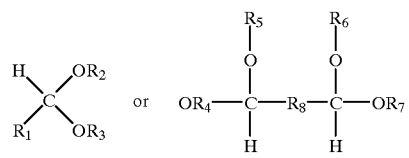

wherein $R_1$ to $R_7$ are linear or branched alkyl radicals of 1 to 20 carbon atoms, or $R_1$ to $R_7$ are linear or branched mono- or polyunsaturated alkenyl radicals of 1 to 20 carbon atoms, and wherein the sum of all carbon atoms in $R_1$ to $R_7$ is 30 or less, and $R_8$ is O or $(CH_2)_n$, where n is a number from 0 to 5.

* * * * *